United States Patent
Enomoto

(10) Patent No.: US 6,813,090 B2
(45) Date of Patent: Nov. 2, 2004

(54) ZOOM LENS SYSTEM

(75) Inventor: Takashi Enomoto, Chiba (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/218,414

(22) Filed: Aug. 15, 2002

(65) Prior Publication Data

US 2003/0048542 A1 Mar. 13, 2003

(30) Foreign Application Priority Data

Aug. 20, 2001 (JP) ........................................ 2001-248809

(51) Int. Cl.$^7$ ............................................. G02B 15/14
(52) U.S. Cl. ....................................................... 359/689
(58) Field of Search ................................. 359/689, 686

(56) References Cited

U.S. PATENT DOCUMENTS

| 5,260,833 A | | 11/1993 | Ito et al. | |
|---|---|---|---|---|
| 5,363,243 A | | 11/1994 | Takayuki et al. | |
| 5,434,711 A | * | 7/1995 | Tetsuya et al. | ............. 359/689 |
| 5,528,429 A | | 6/1996 | Hagimori | |
| 5,566,026 A | | 10/1996 | Yoon | |
| 5,572,365 A | * | 11/1996 | Ito | ............................. 359/677 |
| 5,793,533 A | | 8/1998 | Yoneyama et al. | |
| 5,793,535 A | | 8/1998 | Ito et al. | |
| 5,838,500 A | | 11/1998 | Ito et al. | |
| 5,969,880 A | | 10/1999 | Hasushita et al. | |
| 6,040,948 A | * | 3/2000 | Toyama | ...................... 359/689 |
| 6,342,975 B1 | * | 1/2002 | Yamanashi | .................. 359/689 |
| 6,433,940 B1 | | 8/2002 | Hankawa et al. | |
| 2002/0196559 A1 | * | 12/2002 | Eguchi | ........................ 359/689 |

* cited by examiner

Primary Examiner—Scott J. Sugarman
Assistant Examiner—Deborah A. Raizen
(74) Attorney, Agent, or Firm—Greenblum & Bernstein, P.L.C.

(57) ABSTRACT

A zoom lens system includes a positive first lens group, a positive second lens group, and a negative third lens group. Zooming is performed by moving the first, second and third lens groups in the optical axis direction. The positive first lens group is constituted by a negative lens element and a positive lens element. The zoom lens system satisfies the following condition:

$$0.15 < \Sigma d2G/fW < 0.28 \quad (1)$$

wherein $\Sigma d2G$ designates the distance from the most object-side surface of the positive second lens group to the most image-side surface thereof; and fW designates the focal length of the entire zoom lens system at the short focal length extremity.

6 Claims, 7 Drawing Sheets

Fig.1
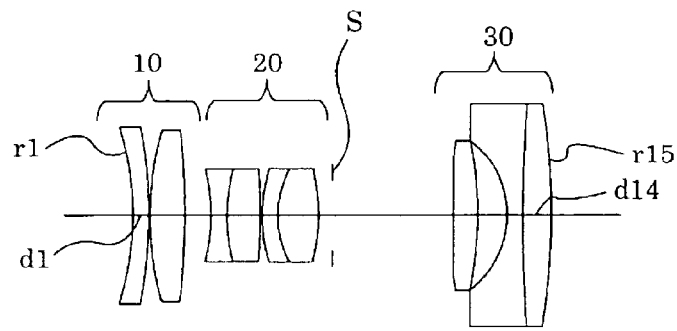
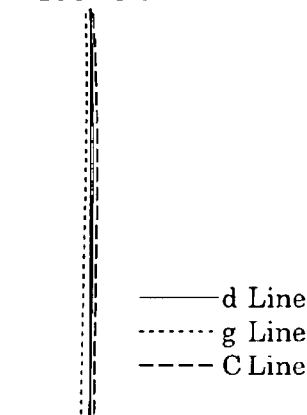
Fig.2A
FNo=5.4
—— d Line
······ g Line
---- C Line
-1.0   1.0
SPHERICAL
ABERRATION
CHROMATIC
ABERRATION
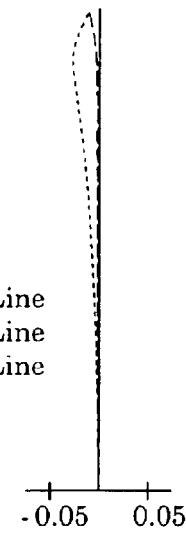
Fig.2B
W=28.9
-0.05   0.05
LATERAL
CHROMATIC
ABERRATION
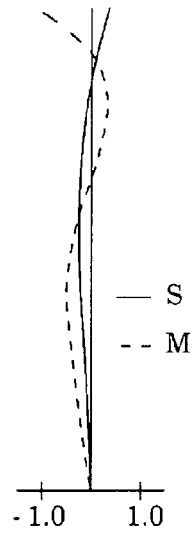
Fig.2C
W=28.9
— S
-- M
-1.0   1.0
ASTIGMATISM
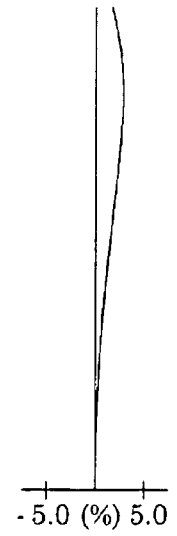
Fig.2D
W=28.9
-5.0 (%) 5.0
DISTORTION FNo=8.0
— d Line
······· g Line
---- C Line
-1.0  1.0
SPHERICAL
ABERRATION

CHROMATIC
ABERRATION

W=16.8
-0.05  0.05
LATERAL
CHROMATIC
ABERRATION

W=16.8
— S
-- M
-1.0  1.0
ASTIGMATISM

W=16.8
-5.0 (%) 5.0
DISTORTION

FNo=12.8
— d Line
······· g Line
---- C Line
-1.0  1.0
SPHERICAL
ABERRATION

CHROMATIC
ABERRATION

W=9.0
-0.05  0.05
LATERAL
CHROMATIC
ABERRATION

W=9.0
— S
-- M
-1.0  1.0
ASTIGMATISM

W=9.0
-5.0 (%) 5.0
DISTORTION

Fig.5
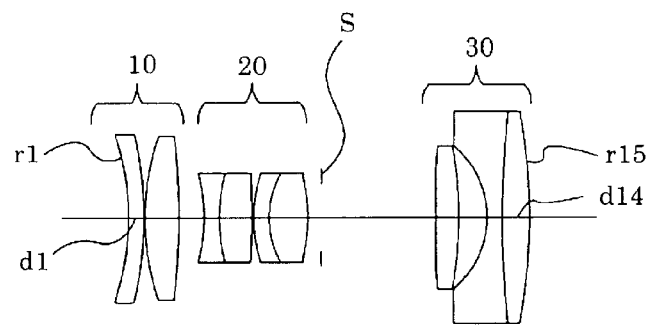
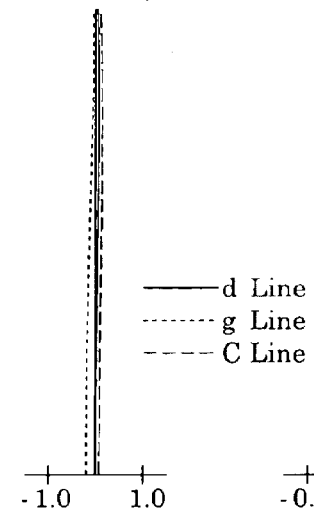
Fig.6A
FNo=5.4
—— d Line
········ g Line
---- C Line
-1.0  1.0
SPHERICAL
ABERRATION
CHROMATIC
ABERRATION
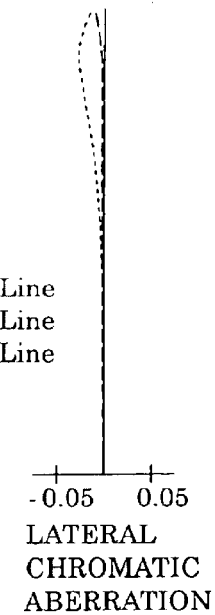
Fig.6B
W=28.9
-0.05  0.05
LATERAL
CHROMATIC
ABERRATION
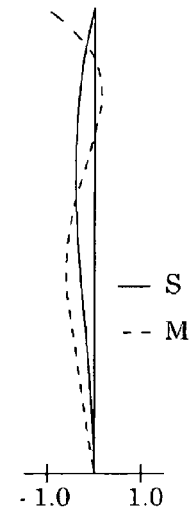
Fig.6C
W=28.9
—— S
-- M
-1.0  1.0
ASTIGMATISM
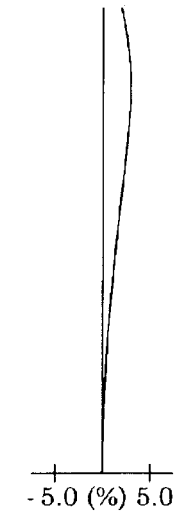
Fig.6D
W=28.9
-5.0 (%) 5.0
DISTORTION Fig.7A FNo=8.0
Fig.7B W=16.8
Fig.7C W=16.8
Fig.7D W=16.8

—— d Line
······· g Line
---- C Line

—— S
-- M

-1.0  1.0
SPHERICAL ABERRATION
CHROMATIC ABERRATION

-0.05  0.05
LATERAL CHROMATIC ABERRATION

-1.0  1.0
ASTIGMATISM

-5.0 (%) 5.0
DISTORTION

Fig.8A FNo=12.8
Fig.8B W=9.0
Fig.8C W=9.0
Fig.8D W=9.0

—— d Line
······· g Line
---- C Line

—— S
-- M

-1.0  1.0
SPHERICAL ABERRATION
CHROMATIC ABERRATION

-0.05  0.05
LATERAL CHROMATIC ABERRATION

-1.0  1.0
ASTIGMATISM

-5.0 (%) 5.0
DISTORTION

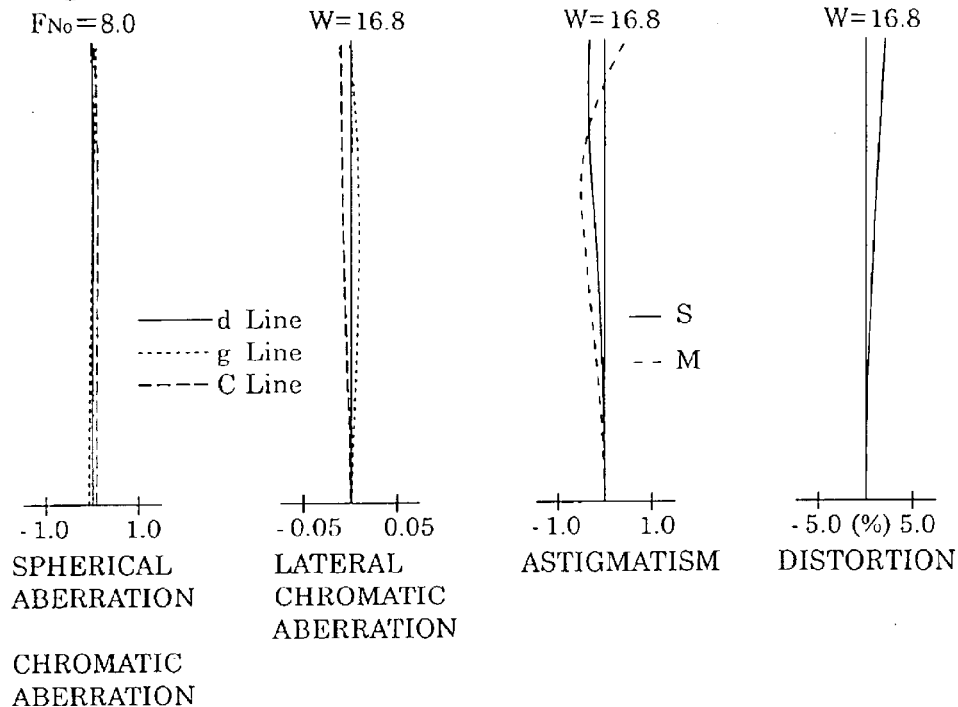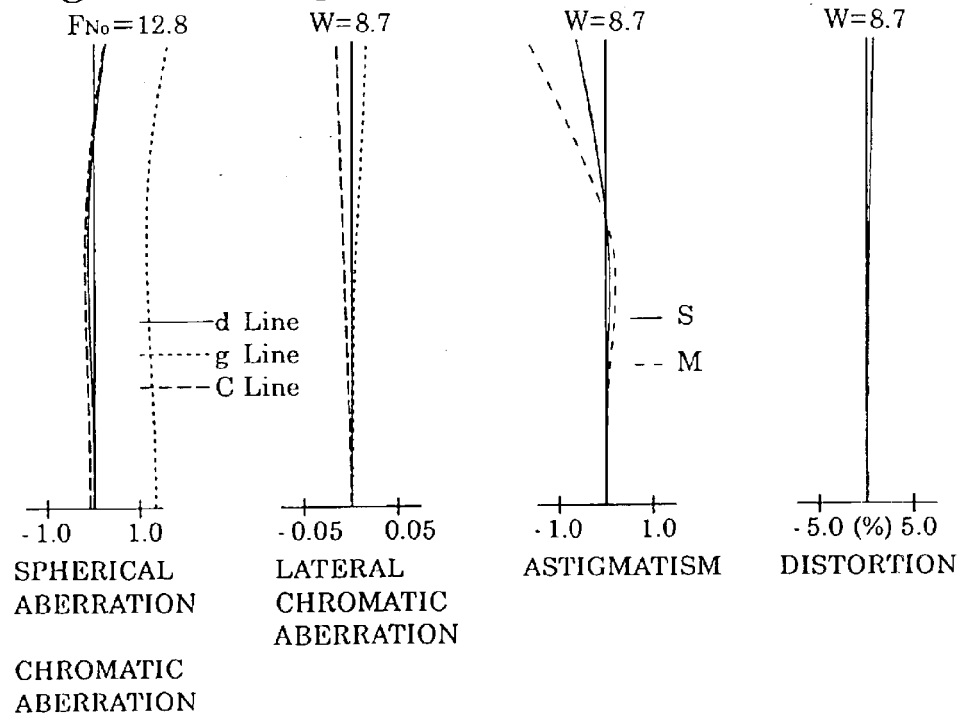

ZOOM LENS SYSTEM

BACKGROUND OF THE INVENTION

1. Field of the Invention

The present invention relates to a zoom lens system for a compact camera.

2. Description of the Prior Art

Unlike a zoom lens system for a single lens reflex camera which requires a space for a quick-return mirror behind the photographing lens system, a zoom lens system of a compact camera does not require such a space, so that a zoom lens system for a compact camera does not need a long back focal distance. Accordingly, a telephoto-type lens system having a positive lens group and a negative lens group, in this order from the object, is generally employed in a compact camera, whereas a retrofocus-type lens system having a negative lens group and a positive lens group, in this order from the object, is employed in a single lens reflex camera.

In such a telephoto-type zoom lens system, in order to attain a zoom ratio of 3 or more, the object-side positive lens group is divided into two lens groups so that a three-lens-group lens system is obtained together with the negative rear lens group. In a three-lens-group zoom lens system, by varying the distance between the first and second lens groups, the zoom ratio of the entire lens system can be secured while field curvature is mainly corrected. Furthermore, since there are more distance parameters in a three-lens-group than in a two-lens-group arrangement, the overall length of the three-lens-group arrangement can be maintained relatively shorter with respect to a higher zoom ratio.

However, the sum of the length in the optical axis direction of each lens group, which influences the thickness of the camera body (i.e., the thickness in the optical-axis direction of the photographing lens system), has to become larger due to an increase of the number of lens elements in each lens group. Therefore even if the overall length of the lens system at the photographing position is shortened, the length of the second lens group, in particular, has a large influence on the thickness of the camera body, so that compactness of the camera is sacrificed.

SUMMARY OF THE INVENTION

The present invention provides a telephoto-type three-lens-group zoom lens system which attains (i) the angle of view of more than 50° at the short focal length extremity, (ii) a zoom ratio of 3 or more (particularly more than 3.5), and (iii) reduces the thickness of the camera body by reducing the thickness of each lens group. Furthermore, the power of each lens group is adequately determined to reduce the overall length of the zoom lens system, so that both the overall length and the diameter of the zoom lens system are reduced as a result.

As an aspect of the present invention, there is provided a zoom lens system including a positive first lens group, a positive second lens group, and a negative third lens group, in this order from the object. Zooming is performed by moving the first, second and third lens groups in the optical axis direction. The positive first lens group is constituted by a negative lens element and a positive lens element, in this order from the object. The zoom lens system satisfies the following condition:

$$0.15 < \Sigma d2G/fW < 0.28 \quad (1)$$

wherein $\Sigma d2G$ designates the distance from the most object-side surface of the positive second lens group to the most image-side surface thereof; and fW designates the focal length of the entire zoom lens system at the short focal length extremity.

The zoom lens system preferably satisfies the following condition:

$$1.6 < fT/f1G < 4 \quad (2)$$

wherein fT designates the focal length of the entire zoom lens system at the long focal length extremity, and f1G designates the focal length of the positive first lens group.

According to another aspect of the present invention, there is provided a zoom lens system including a positive first lens group, a positive second lens group, and a negative third lens group, in this order from the object. Zooming is performed by moving the first, second and third lens groups in the optical axis direction thereof. The positive first lens group is constituted by a negative lens element and a positive lens element, in this order from the object. The zoom lens system satisfies the following conditions:

$$0.15 < \Sigma d2G/fW < 0.33 \quad (1')$$

$$2.0 < fT/f1G < 4 \quad (2')$$

wherein $\Sigma d2G$ designates the distance from the most object-side surface of the positive second lens group to the most image-side surface thereof;

fW designates the focal length of the entire zoom lens system at the short focal length extremity;

fT designates the focal length of the entire zoom lens system at the long focal length extremity, and f1G designates the focal length of the positive first lens group.

In either of the above-explained two aspects of the present invention, the zoom lens system preferably satisfies the following condition:

$$-9 < fT/f3G < -7 \quad (3)$$

wherein fT designates the focal length of the entire zoom lens system at the long focal length extremity, and f3G designates the focal length of the negative third lens group.

In either of the above-explained two aspects of the present invention, for the purpose of correcting chromatic aberration, it is advantageous for the positive second lens group to be constituted by cemented lens elements including a positive lens element and a negative lens element. Furthermore, if the negative third lens group is constituted by a positive lens element, a negative lens element and a positive lens element, in this order from the object, fluctuations of aberrations can be reduced over the entire focal length ranges.

The positive second lens group preferably includes a lens element having an aspherical surface satisfying the following condition:

$$-40 < \Delta I_{ASP} < -10 \quad (4)$$

wherein $\Delta I_{ASP}$ designates the amount of change of the spherical aberration coefficient due to the aspherical surface under the condition that the focal length at the short focal length extremity is converted to 1.0.

The negative third lens group preferably includes a lens element having an aspherical surface satisfying the following condition:

$$0 < \Delta V_{ASP} < 0.7 \qquad (5)$$

wherein $\Delta V_{ASP}$ designates the amount of change of the distortion coefficient due to the aspherical surface under the condition that the focal length at the short focal length extremity is converted to 1.0.

The present disclosure relates to subject matter contained in Japanese Patent Application No. 2001-248809 (filed on Aug. 20, 2001) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1 at the short focal length extremity;

FIG. 5 is a lens arrangement of a zoom lens system according to a second embodiment of the present invention;

FIGS. 6A, 6B, 6C and 6D show aberrations occurred in the lens arrangement shown in FIG. 5 at the short focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity.

DESCRIPTION OF THE PREFERRED EMBODIMENTS

Figure 13:
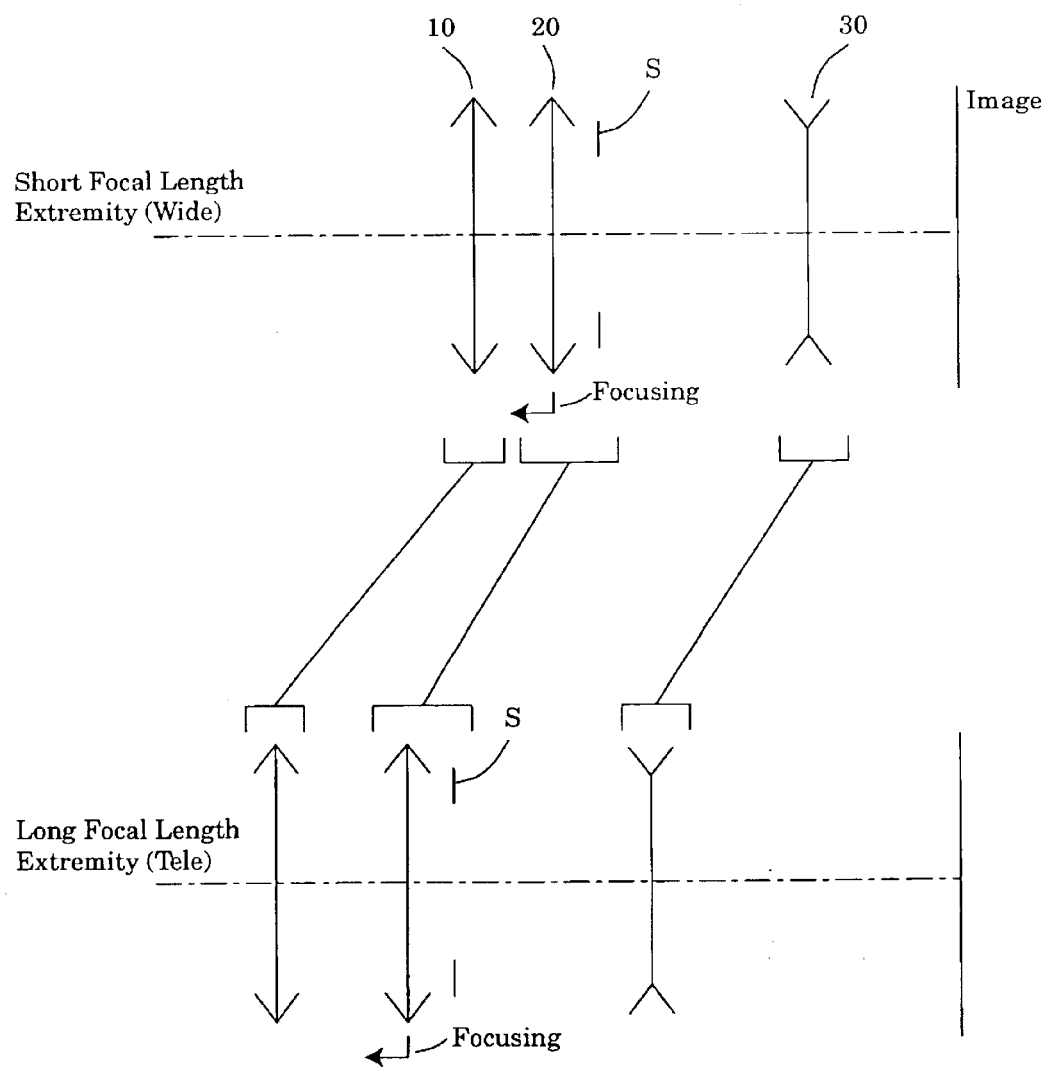
FIG. 13 shows a schematic lens-group moving paths of the zoom lens system according to the present invention.

The zoom lens system of the present invention, as shown in the schematic lens-group moving paths of FIG. 13, includes a positive first lens group 10, a positive second lens group 20, and a negative third lens group 30, in this order from the object. Upon zooming, the first through third lens groups are moved in the optical axis direction. More specifically, upon zooming from the short focal length extremity (Wide) to the long focal length extremity (Tele), the positive first lens group 10, the positive second lens group 20, and the negative third lens group 30 each monotonously move toward the object, and the traveling distance of the positive second lens group 20 is shorter than that of the positive first lens group 10 (the negative third lens group 30).

A diaphragm S is provided between the positive second lens group 20 and the negative third lens group 30, and integrally moves with the positive second lens group 20 upon zooming.

Focusing is performed by moving the positive second lens group 20.

The positive first lens group 10 is constituted by a negative lens element and a positive lens element, in this order from the object. According to this negative-positive lens element arrangement, the thickness of the positive first lens group 10 can be reduced, while an angle of view of more than 50° at the short focal length extremity can be attained. Moreover, this arrangement is advantageous for further miniaturizing the diameter of the positive first lens group 10, while the sufficient amount of peripheral illumination can be secured at the time of photographing when the zoom lens system is at the short focal length extremity.

If the positive first lens group 10 is constituted by more than three lens elements, such an arrangement is advantageous for the correcting of aberrations; however, since the thickness of the positive first lens group 10 increases, the thickness of the camera is inevitably increased.

Furthermore, in the case where an angle of view of 50° or more at the short focal length extremity is secured, the diameter of the positive first lens group 10 becomes larger in order to sufficiently collect peripheral illumination. Still further, the thickness of the positive first lens group 10 and that of the camera undesirably increase.

Conditions (1) and (1') specifies the thickness of the positive second lens group 20. If the thickness of the positive second lens group 20 is reduced so that the conditions (1) and (1') are satisfied, the sum of the thickness of all the lens groups in the zoom lens system can be reduced, and further miniaturization of the camera can be achieved.

If $\Sigma d2G/fW$ exceeds the upper limits of conditions (1) and (1'), the thickness of the positive second lens group 20 increases. Consequently, the sum of the thickness of all the lens groups of the entire zoom lens system increases, so that further miniaturization of the camera cannot be achieved.

If $\Sigma d2G/fW$ exceeds the lower limits of conditions (1) and (1'), it becomes difficult to secure the necessary number of lens elements which constitute the positive second lens group 20, and it becomes difficult to sufficiently correct aberrations.

Conditions (2) and (2') specifies the focal length of the positive first lens group 10. By satisfying these conditions, the traveling distance of the positive first lens group 10 can be reduced, and further miniaturization of the camera can be achieved.

If fT/f1G exceeds the upper limits of conditions (2) and (2'), the power of the positive first lens group 10 becomes too strong, so that the aberrations occurred in the positive first lens group 10 increase. Consequently, fluctuations of aberrations upon zooming increase.

If fT/f1G exceeds the lower limit of conditions (2) and (2'), the power of the positive first lens group 10 becomes weak, and the traveling distance thereof becomes longer. Consequently, further miniaturization of the camera cannot be achieved.

Note that even if Σd2G/fW exceeds the upper limit of condition (1), and if Σd2G/fW does not exceeds the upper limit of condition (1'), further miniaturization of the camera can be achieved by satisfying condition (2').

Condition (3) specifies the focal length of the negative third lens group 30. By satisfying this condition, the traveling distance of the negative third lens group 30 can be made shorter, and further miniaturization of the camera can be achieved.

If fT/f3G exceeds the upper limit of condition (3), the power of the negative third lens group 30 becomes weaker, and the traveling distance thereof becomes longer. Consequently, further miniaturization of the camera cannot be achieved.

If fT/f3G exceeds the lower limit of condition (3), the power of the negative third lens group 30 becomes too strong, and the aberrations occurred in the negative third lens group 30 become larger, and fluctuations of aberrations upon zooming increase.

It is preferable that a lens element having at least one aspherical surface be appropriately employed in the positive second lens group 20. In addition, if the second lens group 20 is constituted by cemented lens elements including a positive lens element and a negative lens element, chromatic aberration can be adequately corrected.

Condition (4) specifies the amount of asphericity of the aspherical surface formed on the lens element in the positive second lens group 20. By satisfying this condition, the number of lens elements of the positive second lens group 20 can be reduced, and spherical aberration especially at the short focal length extremity can be corrected.

If $\Delta I_{ASP}$ exceeds the upper limit of condition (4), the effect on the correcting of spherical aberration by the aspherical surface is smaller, so that the correcting of aberrations cannot be made sufficiently.

If $\Delta I_{ASP}$ exceeds the lower limit of condition (4), the amount of asphericity becomes larger, so that manufacturing of the lens element with the aspherical surface becomes difficult.

If the third lens group 30 is constituted by a positive lens element, a negative lens element, and a positive lens element, the amount of aberrations occurred in third lens group 30 can be reduced, and fluctuations of aberrations which occur from the short focal length extremity to the long focal length extremity can be reduced.

Furthermore, it is preferable that a lens element having at least one aspherical surface be appropriately employed in the negative third lens group 30.

Condition (5) specifies the amount of asphericity in the case where a lens element having at least one aspherical lens surface is provided in the negative third lens group 30. By satisfying this condition, the number of lens elements of the negative third lens group 30 can be reduced, and distortion especially at the long focal length extremity can be corrected.

If $\Delta V_{ASP}$ exceeds the upper limit of condition (5), the amount of asphericity increases, so that manufacturing the lens element with the aspherical surface becomes difficult.

If $\Delta V_{ASP}$ exceeds the lower limit of condition (5), the effect on the correcting of distortion by the aspherical surface is smaller, so that the correcting of aberrations cannot be made sufficiently.

1. The shape of an aspherical surface is defined as follows:

$$x=cy^2/(1+[1-\{1+K\}c^2y^2]^{1/2})+A4y^4+A6y^6+A8y^8+A10y^{10}$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

$B4=A4+Kc^3/8$;

$B6=A6+(K^2+2K)c^5/16$;

$B8=A8+5(K^3+3K^2+3K)c^7/128$ $B10=A10+7(K^4+4K^3+6K^2+4K)c^9/256$; and therefore, the following equation is obtained:

$$x=cy^2/[1+[1-c^2y^2]^{1/2}]+B4y^4+B6y^6+B8y^8+B10y^{10}+$$

3. Furthermore, in order to normalize the focal length f to 1.0, the followings are considered:

$X=x/f$; $Y=y/f$; $C=f*c$;

$\alpha4=f^3B4$; $\alpha6=f^5B6$; $\alpha8=f^7B8$; $\alpha10=f^9B10$

Accordingly, the following equation is obtained.

$$X=CY^2/[1+[1-C^2Y^2]^{1/2}]+\alpha4Y^4+\alpha6Y^6+\alpha8Y^8+\alpha10Y^{10}+$$

4. $\Phi=8(N'-N)\alpha4$ is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient ($\alpha4$) on each aberration coefficient is defined as:

$\Delta I=h^4\Phi$ $\Delta II=h^3k\Phi$ $\Delta III=h^2k^2\Phi$ $\Delta IV=h^2k^2\Phi$ $\Delta V=hk^3\Phi$ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is -1;

N' designates the refractive index of a medium on the side of the image with respect to the aspherical surface; and N designates the refractive index of a medium on the side of the object with respect to the aspherical surface.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, Nd designates the refractive index of the d-line, and v designates the Abbe number.

Embodiment 1

FIG. 1 is a lens arrangement of a zoom lens system according to a first embodiment of the present invention. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment. The positive first lens group 10 includes a negative meniscus lens having a concave surface facing toward the object, and a positive lens element, in this order from the object. The positive second lens group 20 includes two set of negative-positive cemented lens elements. The negative third lens group 30 includes a positive lens element, a biconcave negative lens element, and a positive lens element, in this order from the object. The biconcave negative lens element and the most image-side positive lens are cemented to each other. The diaphragm S is provided at a position 1.30 behind (on the image side) the second lens group 20 (surface No. 10).

TABLE 1

$F_{NO}$ = 1:5.4 – 8.0 – 12.8
f = 38.50 – 70.00 – 135.00
W = 28.9 – 16.8 – 9.0
$f_B$ = 8.59 – 26.05 – 60.28

| Surface No. | r | d | Nd | v |
| --- | --- | --- | --- | --- |
| 1 | −28.201 | 1.50 | 1.85000 | 23.7 |
| 2 | −45.754 | 0.10 | — | — |
| 3 | 31.270 | 3.35 | 1.62218 | 59.0 |
| 4 | −78.550 | 2.50 – 11.00 – 17.45 | — | — |
| 5 | −17.221 | 1.50 | 1.88300 | 40.8 |
| 6 | 17.221 | 3.20 | 1.81768 | 25.1 |
| 7 | −67.560 | 0.20 | — | — |
| 8 | 15.383 | 1.50 | 1.84666 | 23.8 |
| 9 | 9.537 | 3.90 | 1.58636 | 60.9 |
| 10* | −16.600 | 12.78 – 7.22 – 3.00 | — | — |
| 11* | −134.547 | 2.30 | 1.58547 | 29.9 |
| 12 | −37.323 | 2.78 | — | — |
| 13 | −9.348 | 1.50 | 1.80825 | 45.0 |
| 14 | 152.608 | 2.70 | 1.84506 | 23.8 |
| 15 | −68.043 | — | — | — |

TABLE 1-continued

Aspherical surface data (the aspherical surface coefficients not indicated are zero (0.00)):

| Surf. No. | K | A4 | A6 | A8 |
| --- | --- | --- | --- | --- |
| 10 | 0.00 | $0.80148 \times 10^{-4}$ | $-0.45857 \times 10^{-6}$ | 0.00 |
| 11 | 0.00 | $0.15344 \times 10^{-3}$ | $-0.10688 \times 10^{-5}$ | $0.21325 \times 10^{-7}$ |

*designates the aspherical surface which is rotationally symmetrical with respect to the optical axis.

Embodiment 2

FIG. 5 is a lens arrangement of a zoom lens system according to a second embodiment of the present invention. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment. The basic lens arrangement of the second embodiment is the same as the first embodiment. The diaphragm S is provided at a position 1.30 behind (on the image side) the second lens group 20 (surface No. 10).

TABLE 2

$F_{NO}$ = 1:5.4 – 8.0 – 12.8
f = 38.50 – 70.00 – 135.00
W = 28.9 – 16.8 – 9.0
$f_B$ = 8.48 – 25.64 – 60.24

| Surface No. | r | d | Nd | v |
| --- | --- | --- | --- | --- |
| 1 | −27.440 | 1.50 | 1.84666 | 23.8 |
| 2 | −38.599 | 0.10 | — | — |
| 3 | 26.107 | 3.35 | 1.48000 | 71.3 |
| 4 | −74.762 | 2.50 – 11.50 – 17.45 | — | — |
| 5 | −17.398 | 1.50 | 1.88300 | 40.8 |
| 6 | 17.398 | 3.20 | 1.84000 | 24.4 |
| 7 | −86.119 | 0.20 | — | — |
| 8 | 14.745 | 1.50 | 1.84666 | 23.8 |
| 9 | 9.178 | 3.82 | 1.58636 | 60.9 |
| 10* | −16.585 | 12.61 – 7.08 – 3.00 | — | — |
| 11* | −126.000 | 2.30 | 1.58547 | 29.9 |
| 12 | −38.826 | 2.84 | — | — |
| 13 | −9.444 | 1.50 | 1.83012 | 43.1 |
| 14 | 104.225 | 2.70 | 1.85000 | 23.7 |
| 15 | −59.224 | — | — | — |

Aspherical surface data (the aspherical surface coefficients not indicated are zero (0.00)):

| Surf. No. | K | A4 | A6 | A8 |
| --- | --- | --- | --- | --- |
| 10 | 0.00 | $0.88498 \times 10^{-4}$ | $-0.42608 \times 10^{-6}$ | 0.00 |
| 11 | 0.00 | $0.15398 \times 10^{-3}$ | $-0.10286 \times 10^{-5}$ | $0.19381 \times 10^{-7}$ |

*designates the aspherical surface which is rotationally symmetrical with respect to the optical axis.

Embodiment 3

Figure 3A:
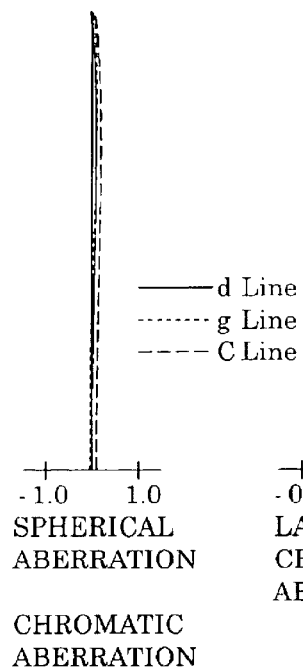
FIGS. 3A, 3B, 3C and 3D show aberrations occurred in the lens arrangement shown in FIG. 1 at an intermediate focal length.
Figure 3B:
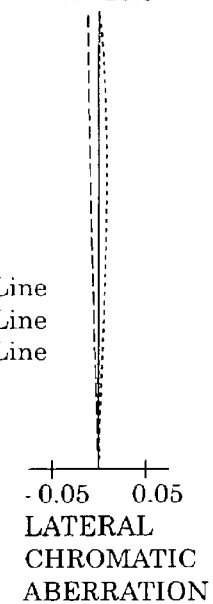
Figure 3C:
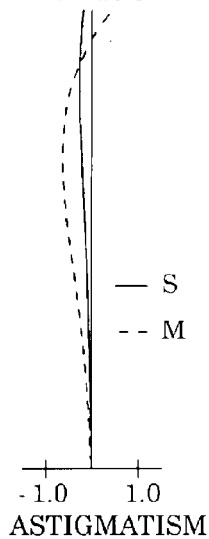
Figure 3D:
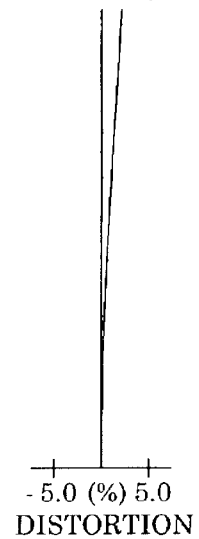
Figure 4A:
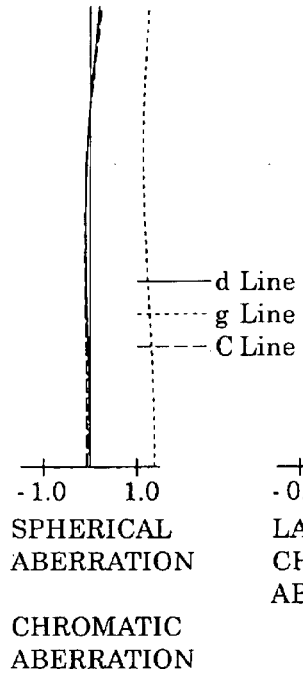
FIGS. 4A, 4B, 4C and 4D show aberrations occurred in the lens arrangement shown in FIG. 1 at the long focal length extremity.
Figure 4B:
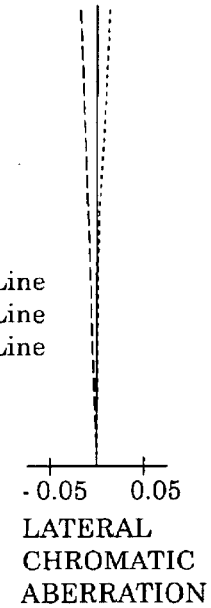
Figure 4C:
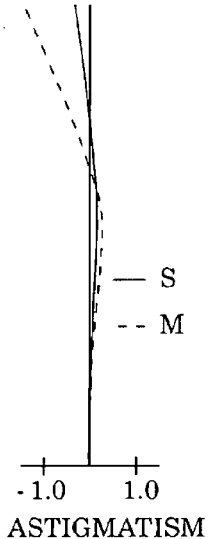
Figure 4D:
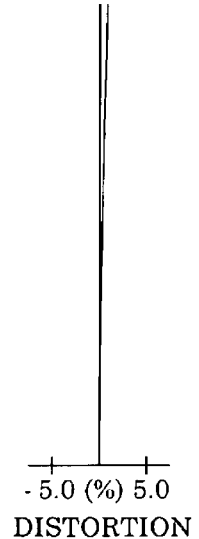
Figure 9:
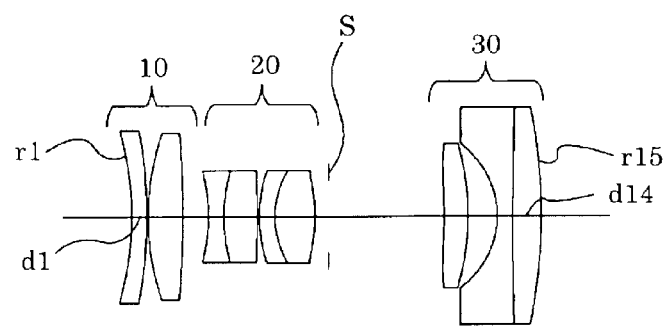
FIG. 9 is a lens arrangement of a zoom lens system according to a third embodiment of the present invention.
Figures 10A, 10B, 10C, 10D:
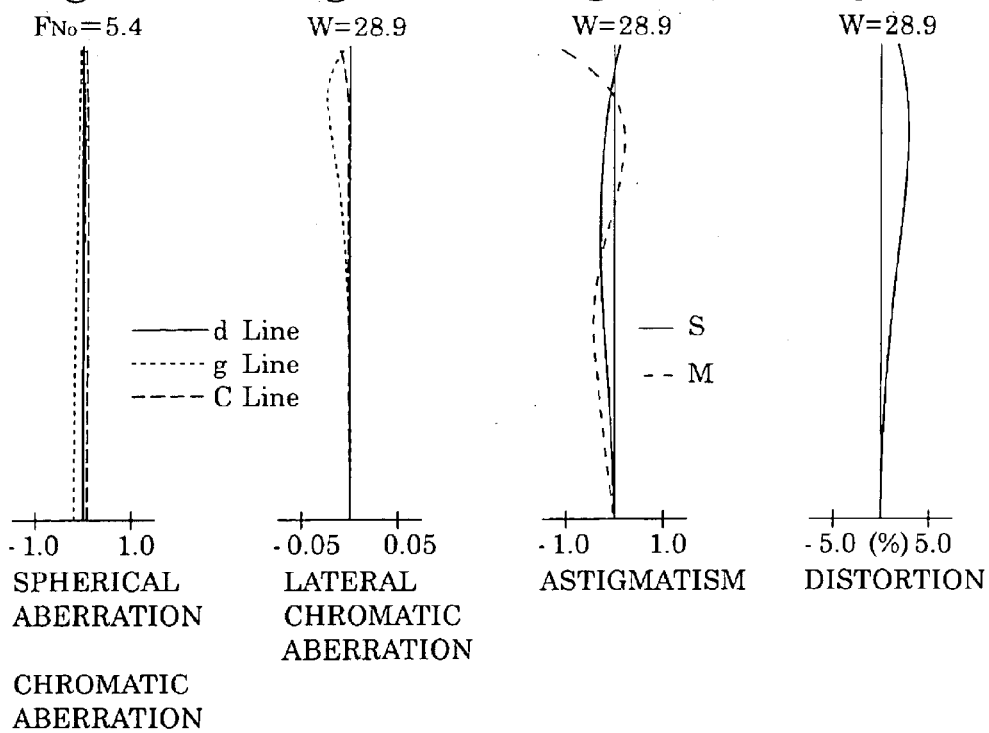
FIGS. 10A, 10B, 10C and 10D show aberrations occurred in the lens arrangement shown in FIG. 9 at the short focal length extremity.

FIG. 9 is a lens arrangement of a zoom lens system according to a third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical data of the third embodiment. The basic lens arrangement of the third embodiment is the same as the first embodiment. The diaphragm S is provided at a position 1.30 behind (on the image side) the second lens group 20 (surface No. 10).

TABLE 3

$F_{NO}$ = 1:5.4 – 8.0 – 12.8
f = 38.50 – 70.00 – 140.00
W = 28.9 – 16.8 – 8.7
$f_B$ = 8.67 – 26.12 – 64.94

| Surface No. | r | d | Nd | ν |
|---|---|---|---|---|
| 1 | −31.553 | 1.50 | 1.84666 | 23.8 |
| 2 | −45.754 | 0.10 | — | — |
| 3 | 25.808 | 3.35 | 1.48000 | 71.3 |
| 4 | −95.514 | 2.50 – 11.80 – 17.45 | — | — |
| 5 | −17.184 | 1.50 | 1.88300 | 40.8 |
| 6 | 17.184 | 3.20 | 1.84000 | 24.4 |
| 7 | −86.128 | 0.20 | — | — |
| 8 | 14.196 | 1.50 | 1.84666 | 23.8 |
| 9 | 8.874 | 3.94 | 1.58636 | 60.9 |
| 10* | −16.500 | 12.50 – 7.07 – 3.00 | — | — |
| 11* | −58.268 | 2.30 | 1.58547 | 29.9 |
| 12 | −26.940 | 2.80 | — | — |
| 13 | −9.012 | 1.50 | 1.80471 | 45.3 |
| 14 | 359.640 | 2.70 | 1.85000 | 23.7 |
| 15 | −55.567 | — | — | — |

Aspherical surface data (the aspherical surface coefficients not indicated are zero (0.00)):

| Surf. No. | K | A4 | A6 | A8 |
|---|---|---|---|---|
| 10 | 0.00 | 0.92904 × 10$^{-4}$ | −0.37785 × 10$^{-6}$ | 0.00 |
| 11 | 0.00 | 0.15971 × 10$^{-3}$ | −0.80926 × 10$^{-6}$ | 0.22077 × 10$^{-7}$ |

*designates the aspherical surface which is rotationally symmetrical with respect to the optical axis.

The numerical values of each condition of each embodiment are shown in Table 4.

TABLE 4

| | Embod.1 | Embod.2 | Embod.3 |
|---|---|---|---|
| Conditions (1)(1') | 0.268 | 0.265 | 0.269 |
| Conditions (2)(2') | 2.33 | 2.32 | 2.25 |
| Condition (3) | −7.88 | −7.92 | −8.09 |
| Condition (4) | −22.42 | −23.92 | −25.05 |
| Condition (5) | 0.5802 | 0.5695 | 0.5770 |

As can be understood from Table 4, each embodiment satisfies each condition. Furthermore, as can be understood from the aberration diagrams, the various aberrations are adequately corrected.

According to the above description, a telephoto-type three-lens-group zoom lens system, which attains (i) the angle of view of more than 50° at the short focal length extremity, (ii) a zoom ratio of 3 or more (particularly more than 3.5), and (iii) reduces the thickness of the camera body by reducing the thickness of each lens group, can be obtained. Furthermore, the power of each lens group is adequately determined to reduce the overall length of the zoom lens system, so that both the overall length and the diameter of the zoom lens system are reduced as a result.

What is claimed is:

1. A zoom lens system comprising a positive first lens group, a positive second lens group, and a negative third lens group, in this order from an object, wherein zooming is performed by moving said first, second and third lens groups in the optical axis direction;

wherein said positive first lens group comprises a negative lens element and a positive lens element, in this order from said object;

wherein said negative third lens group comprises a positive lens element, a negative lens element and a positive lens element, in this order from said object; and wherein said zoom lens system satisfies the following condition:

$$0.15 < \Sigma d2G/fW < 0.28$$

wherein

Σd2G designates the distance from the most object-side surface of said positive second lens group to the most image-side surface thereof; and fW designates the focal length of the entire zoom lens system at the short focal length extremity.

2. The zoom lens system according to claim 1, satisfying the following condition:

$$1.6 < fT/f1G < 4$$

wherein fT designates the focal length of the entire zoom lens system at the long focal length extremity, and f1G designates the focal length of said positive first lens group.

3. The zoom lens system according to claim 1, satisfying the following condition:

$$-9 < fT/f3G < -7$$

wherein fT designates the focal length of the entire zoom lens system at the long focal length extremity, and f3G designates the focal length of said negative third lens group.

4. The zoom lens system according to claim 1, wherein said positive second lens group comprises cemented lens elements including a positive lens element and a negative lens element.

5. The zoom lens system according to claim 1, wherein said positive second lens group comprises a lens element having an aspherical surface satisfying the following condition:

$$-40 < \Delta I_{ASP} < -10$$

wherein $\Delta I_{ASP}$ designates the amount of change of the spherical aberration coefficient due to the aspherical surface under the condition that the focal length at the short focal length extremity is converted to 1.0.

6. The zoom lens system according to claim 1, wherein said negative third lens group comprises a lens element having an aspherical surface satisfying the following condition:

$$0 < \Delta V_{ASP} < 0.7$$

wherein $\Delta V_{ASP}$ designates the amount of change of the distortion coefficient due to the aspherical surface under the condition that the focal length at the short focal length extremity is converted to 1.0.

* * * * *